Patented July 31, 1945

UNITED STATES PATENT OFFICE 2,380,478

LACTONES OF 2-ALKYL-3-ALKOXY-4-HYDROXYMETHYL-5-CARBOXYPYRIDINE

Eric T. Stiller, New York, N. Y., assignor to Merck & Co., Inc., Rahway, N. J., a corporation of New Jersey No Drawing. Application December 16, 1941, Serial No. 423,136

10 Claims. (Cl. 260—297.5)

This invention relates to the lactones of 2-alkyl-3-alkoxy-4-hydroxymethyl - 5 - carboxypyridine, and to processes of preparing the same, and is a continuation of our co-pending application, Serial No. 267,618, filed April 13, 1939.

An object of the invention is the preparation of the above-mentioned lactones by simple and economical processes.

I have discovered that the lactones of 2-alkyl-3-alkoxy-4-hydroxymethyl - 5 - carboxypyridine may be easily prepared in different ways, for example by oxidizing a solution of an alkyl ether of 2-alkyl-3-hydroxy-4,5-dihydroxymethyl pyridine by means of an oxidizing agent, and isolating the lactone formed. The alkyl esters may be prepared according to the process set forth in application Serial No. 247,479, filed December 23, 1938.

The lactones of the present invention may be used for various purposes, for example as intermediates in the manufacture of substances having a biological activity of the type shown by vitamin B$_6$.

The following examples illustrate methods of carrying out the invention, but it is to be understood that these examples are by way of illustration and not of limitation.

An aqueous solution of 323 mgs. of the methyl ether of vitamin B$_6$ are oxidized by slowly adding 27.4 cc. of 0.0947 M barium permanganate, and then allowing the mixture to stand at room temperature for 16 hours. The manganese dioxide formed is removed by centrifuging and is then thoroughly extracted with warm water. The combined mother liquor and extracts are evaporated at 50° C. under reduced pressure to 50 cc. The barium is quantitatively removed by the addition of N/10 sulfuric acid, and the precipitated barium sulfate is thoroughly extracted with water. The aqueous solution of the oxidation products is evaporated to dryness, and submitted to molecular distillation at 10$^{-4}$ mm. The crystalline material is collected at a bath temperature of 100–110° C., and resublimed at a bath temperature of 90–95° C. It is recrystallized from water and the lactone of 2-methyl-3-methoxy-4-hydroxymethyl-5-carboxypyridine is obtained as colorless needles, melting point 108–109° C.

The lactone may also be isolated from the combined mother liquor and extracts of the oxidation products by quantitatively removing the barium ion with N/10 sulfuric acid, followed by evaporation at 50° C. under reduced pressure to a volume of 1.5 cc. Upon cooling, the lactone crystallizes out. This crystalline material is extracted with ether or benzene, the solvent is evaporated, and the lactone recrystallized from water. The crystals are very soluble in alcohols, and sparingly soluble in ether.

Other lactones of 2-alkyl-3-alkoxy-4-hydroxymethyl-5-carboxypyridine can be obtained by a similar method. For example, when starting with 2-ethyl-3-ethoxy-4,5-di-(hydroxymethyl) pyridine, the 2-ethyl-3-ethoxy lactone is obtained.

Modifications may be made in carrying out the present invention without departing from the spirit and scope thereof. For example, oxidizing agents other than barium permanganate may be used.

I claim:

1. A lactone of 2-alkyl-3-alkoxy-4-hydroxymethyl-5-carboxypyridine.

2. The lactone of 2-methyl-3-methoxy-4-hydroxymethyl-5-carboxypyridine.

3. The lactone of 2-ethyl-3-ethoxy-4-hydroxymethyl-5-carboxypyridine.

4. The process comprising oxidizing a solution of a 2-alkyl-3-alkoxy-4,5-di-(hydroxymethyl) pyridine by means of barium permanganate to produce the lactone of 2-alkyl-3-alkoxy-4-hydroxymethyl-5-carboxy-pyridine and recovering the thus produced lactone.

5. The process comprising oxidizing a solution of an alkyl ether of vitamin B$_6$ by means of barium permanganate to produce the lactone of 2-methyl-3-alkoxy-4-hydroxymethyl-5-carboxy - pyridine, and recovering the thus produced lactone.

6. The process comprising oxidizing a solution of the methyl ether of vitamin B$_6$ by means of barium permanganate to produce the lactone of 2-methyl-3-methoxy-4-hydroxymethyl - 5 - carboxy-pyridine, and recovering the thus produced lactone.

7. The process comprising oxidizing a solution of 2-ethyl-3-ethoxy-4,5-di-(hydroxymethyl) pyridine by means of barium permanganate to produce the lactone of 2-ethyl-3-ethoxy-4-hydroxymethyl-5-carboxy-pyridine, and recovering the thus produced lactone.

8. The process comprising oxidizing a solution of the methyl ether of vitamin B$_6$ by means of barium permanganate, removing the formed manganese dioxide, treating the solution with sulfuric acid, removing the formed barium sulfate, and recovering the lactone of 2-methyl-3-methoxy-4-hydroxymethyl-5-carboxypyridine.

9. The process comprising oxidizing a solution of 2-ethyl-3-ethoxy-4,5-di-(hydroxymethyl) pyridine with barium permanganate, removing the formed manganese dioxide, treating the solution with sulfuric acid, removing the formed barium sulfate, and recovering the lactone of 2-ethyl-3-ethoxy-4-hydroxymethyl-5-carboxypyridine.

10. The process comprising oxidizing a solution of a 2-alkyl-3-alkoxy-4,5-di-(hydroxymethyl) pyridine by means of barium permanganate to produce the lactone of 2-alkyl-3-alkoxy-4-hydroxymethyl-5-carboxy-pyridine at ordinary temperature, and recovering the thus produced lactone.

ERIC T. STILLER.

CERTIFICATE OF CORRECTION.

Patent No. 2,380,478.                                July 31, 1945.

ERIC T. STILLER.

It is hereby certified that error appears in the printed specification of the above numbered patent requiring correction as follows: Page 1, first column, line 15, for the word "esters" read --ethers--; and that the said Letters Patent should be read with this correction therein that the same may conform to the record of the case in the Patent Office.

Signed and sealed this 16th day of October, A. D. 1945.

Leslie Frazer (Seal)                    First Assistant Commissioner of Patents.